United States Patent
Demartines et al.

(10) Patent No.: US 6,661,409 B2
(45) Date of Patent: Dec. 9, 2003

(54) AUTOMATICALLY SCROLLING HANDWRITTEN INPUT USER INTERFACE FOR PERSONAL DIGITAL ASSISTANTS AND THE LIKE

(75) Inventors: Pierre Demartines, San Francisco, CA (US); Giovanni Seni, Mountain View, CA (US)

(73) Assignee: Motorola, Inc., Schaumburg, IL (US)

( * ) Notice: Subject to any disclaimer, the term of this patent is extended or adjusted under 35 U.S.C. 154(b) by 196 days.

(21) Appl. No.: 09/938,319

(22) Filed: Aug. 22, 2001

(65) Prior Publication Data

US 2003/0038788 A1 Feb. 27, 2003

(51) Int. Cl.$^7$ ................................................ G09G 5/00
(52) U.S. Cl. ........................ 345/173; 345/179; 382/189
(58) Field of Search ................................. 345/156, 157, 345/173, 174, 155, 179, 785; 178/18.01–18.11, 19.01–19.07; 382/186, 187, 189, 312, 313

(56) References Cited

U.S. PATENT DOCUMENTS

| | | | |
|---|---|---|---|
| 5,500,937 A | * | 3/1996 | Thompson-Rohrlich .... 345/764 |
| 5,838,302 A | | 11/1998 | Kuriyama et al. |
| 6,005,973 A | | 12/1999 | Seybold et al. |
| 6,188,789 B1 | | 2/2001 | Marianetti, II et al. |
| 6,256,009 B1 | * | 7/2001 | Lui et al. ..................... 345/684 |

* cited by examiner

*Primary Examiner*—Dennis-Doon Chow
(74) *Attorney, Agent, or Firm*—James A. Lamb

(57) ABSTRACT

A handheld device 100 such as a personal digital assistant (PDA) or the like, a handwritten input user interface (HIUI), a method of interfacing handwritten text and a program product therefor. A lower portion of a touch enabled display is designated as a handwriting input area 104. Action icons 106, 108, 110, 112 and 114 are disposed at a right side of the handwriting user interface 102. Recognized text is displayed on the screen in a text display area located between a file management tool bar 116 and the handwritten input area 104. A scroll bar 118 is disposed at the right side of the display 112. As text is continuously entered each individual word may be recognized, and inserted into the end of the text stream. A word separator 120 may demarcate or bracket individual words in a continuous input stream. A secondary list of potential recognition candidates may be available for display in a box 128 and offered for substitution for or in lieu of the recognized word. Handwritten text may be continuously entered and displayed in the handwriting input area 104 as digital ink, the input point staying approximately fixed with the ink display automatically scrolling. The input area behaves as a "treadmill" or "ticker tape" that is moving from right to left, thereby giving the illusion of a continuous writing space. The speed of the "treadmill" automatically adapts to writing speed. The device 100 may include a communications function and, in particular the device may include an antenna 122 for wireless communication. Individual function switches, buttons and other controls are disposed about the device.

29 Claims, 3 Drawing Sheets

AUTOMATICALLY SCROLLING HANDWRITTEN INPUT USER INTERFACE FOR PERSONAL DIGITAL ASSISTANTS AND THE LIKE

RELATED APPLICATION

The present invention is related to U.S. patent application Ser. No. 09/901,878 entitled "Handwriting Interface for Personal Digital Assistants and the Like" to Seni et al., assigned to the assignee of the present invention and filed Jul. 9, 2001.

BACKGROUND OF THE INVENTION

1. Field of the Invention

The present invention is related to personal digital assistants (PDAs) and more particularly to a user input interface for a PDA or the like.

2. Background Description

Portable computing devices, such as what is normally referred to as a personal digital assistant (PDA), are increasing in popularity. A typical PDA is a limited function microcomputer provided with a pressure sensitive liquid crystal diode (LCD) display (a touch pad or a touch screen) for input and output (I/O). PDAs are being adapted for wireless Internet communication, e.g., using a modem for e-mail and web browsing. Further, for text input PDAs are known that have a specialized stroke based alphabet interface, e.g., Graffiti®, a selectable on-screen QWERTY keypad, or an expansion pack keyboard.

As these portable devices become smaller and more specialized, text input has become more difficult and less practical. Typical prior art handwriting recognition software may require users to learn special characters or effect a handwriting style in order to enter text. Text input using the Graffiti® unistroke (i.e., written with a single pen trace) alphabet can be un-natural because it requires users to adhere to strict rules that restrict character shapes; text input using an on-screen QWERTY keypad is somewhat clumsy because only small reductions in size can be made to keyboards before they become awkward to use. An expansion keyboard is impractical for on-the-go input. With either, the tapping on individual characters or the typing is less desirable than being able to handwrite notes or messages. Meanwhile, the demand for PDA information exchange, e-mail and internet access requires entry and retrieval of increasing amounts of data with the handheld device.

Handwriting recognition (HWR) programs capable of dealing with natural (i.e., unrestricted in style) handwritten input are being developed to add to function and usefulness to PDAs and are crucial to the growth of mobile computing in the communications field. Handwriting recognition software, such as Transcriber (formerly known as CalliGrapher) from Microsoft Corp., allows the user to write anywhere on the screen, including on top of any displayed application and system elements. After a time-out period following a pen-lift, the digital ink is removed from the screen and then recognized, the recognition results are then displayed on the screen as ASCII text, and the next sentence or string of words can be handwritten on the screen.

For small screen sized devices such as of PDAs, what are typically referred to as write-anywhere user interfaces, such as used by Transcriber, allow users to write two or three lines at a time at most, with at best two or three words each, which limits entry and prevents continuous uninterrupted longhand entry. Further, these write-anywhere interfaces are problematic because it is difficult to differentiate whether the stylus is acting as a pointer, for clicking on application icons and the like, or an inking instrument for text entry. A common solution involves an un-natural "tap and hold" scheme wherein the pen has to be maintained down without dragging it for a certain amount of time in order to get the stylus to act temporarily as a mouse. This can lead to text input errors and the attendant aggravation and input delays caused by such errors.

Another problem with a write-anywhere user interface is that fingers, as the writer is moving his/her hand through the screen, can often interfere with the (pressure-based) pen tracking mechanism. Simultaneous pressure from the stylus and a carelessly positioned pinky finger can cause the device to mislocate the intended stylus entry point, e.g., the device may use the average of the two contact locations. One solution to these problems has been provided by Seni et al., where a special area at the bottom of the screen is used for handwritten input, inputting one word at a time.

Thus, there is a need for handwriting input user interface that allows continuous handwritten input, entering arbitrarily long streams of text on small palm-sized devices without interruption, i.e., without requiring the writer to stop after every character or word, and free from the ambiguities of write-anywhere interfaces.

BRIEF DESCRIPTION OF THE DRAWINGS

The foregoing and other objects, aspects and advantages will be better understood from the following detailed preferred embodiment description with reference to the drawings, in which.

DESCRIPTION OF PREFERRED EMBODIMENTS OF THE INVENTION

Figure 1A:
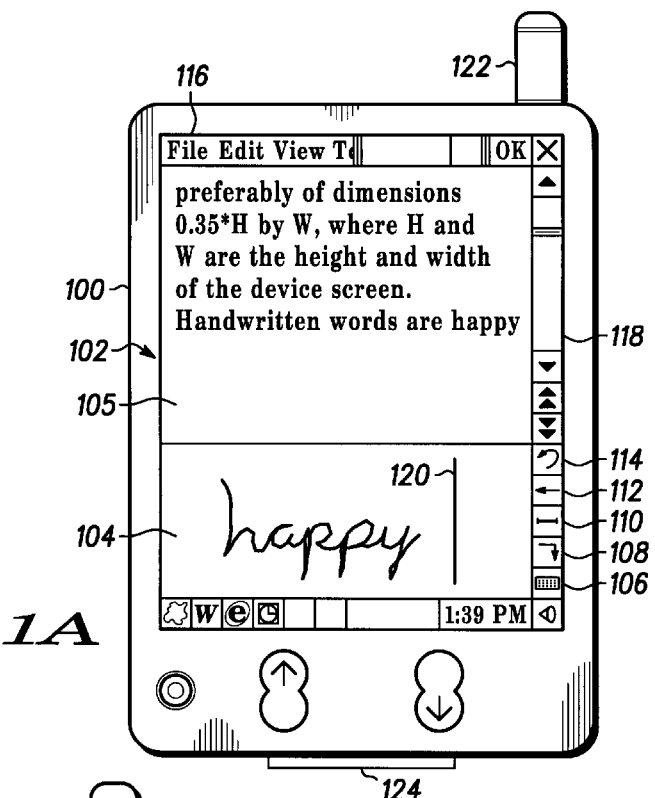
FIGS. 1A&B are plan views of a handheld device in a preferred form of the invention showing a graphical handwriting user interface having a scrolling text input screen area.

The present invention is a method of interfacing with, and a handwritten input user interface (HIUI) for, small (shirt-pocket sized) portable devices with a touch-enabled input/output (I/O) screen, such as are commonly known as personal digital assistants (PDAs). The I/O screen includes a handwritten input I/O screen area that behaves as a "treadmill," receiving streams of handwritten input strokes and immediately displaying a duplicate of each stroke as digital ink therebeneath, while simultaneously moving digital ink strokes from right to left as the user handwrites text on what appears to be a virtual "ticker-tape." Thus, the user is presented with illusion of never running out of writing space. The streaming speed of the treadmill or ticker tape I/O automatically adapts to writing speed in a natural way such that the entry point remains, roughly, at the same horizontal location during each handwritten entry. In this manner, unlike prior interfaces wherein space constraints limit the ability to continuously write on the device screen and thus slows text input, the present interface speeds throughput. A user is not required to wait for more screen space after the screen is filled because clear screen space is continuously made available by the scrolling action provided in the screen input area.

The portable devices may be capable of wireless message transmission (such as for web browsing and/or e-mail). The user interface of the present invention is typically in software and loaded into PDA storage. A state of the art handwriting recognition engine also is included in software. The handwriting user interface of the present invention enhances the usability, flexibility and power of the handheld device in which it is installed. An entire message may be quickly handwritten, converted to text as it is written, stored and then, transmitted, for example.

Handwritten entries may be made continuously in a designated input area on the touch screen. The preferred location of the input area is the lower portion of the screen, so as to only partially block view of any application currently running on the device. Handwritten text is continuously entered onto a virtual ticker-tape in the input area, using a stylus and requiring minimal horizontal stylus deflection during entry. If recognition is included, the recognition engine demarcates word boundaries to identify individual words within the input stream as well as provide word recognition. Recognition results can be displayed in the normal display area of the screen above the input area and the input area scrolls automatically, behaving as treadmill, or ticker tape moving from right to left automatically adapting to writing speed. Continuous or continuously is used herein with respect to handwritten input to mean that pauses are not required between words, i.e., without requiring the user to stop after each word during entry. Of course, the user may stop or pause as the user desires, but this is irrespective of and in no way restrictive of the present invention. Thus, a user may continuously write (enter) a phrase, a sentence, a paragraph, a page, a book (as long as the input device has enough memory) or any combination thereof, free from pauses that might otherwise be artificially imposed by system constraints.

Figure 1B:
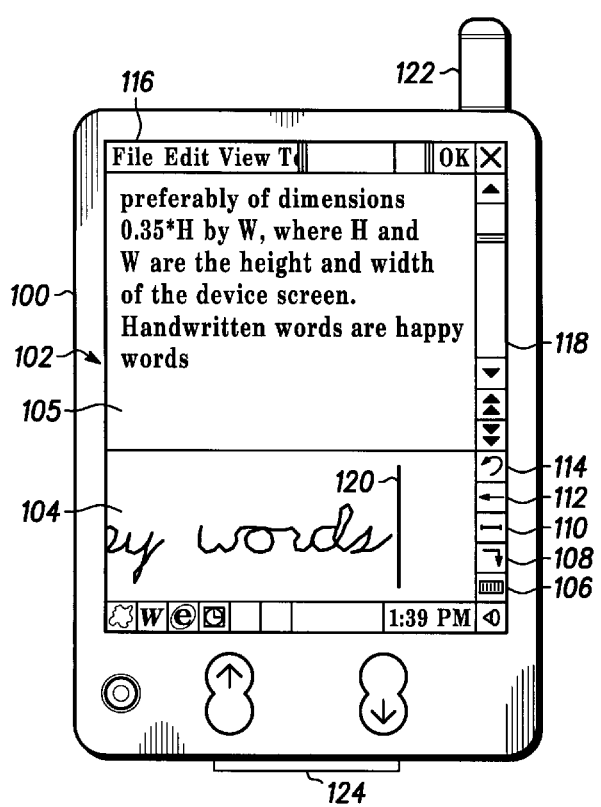

FIGS. 1A–B are an example of a preferred embodiment handheld device 100 with a graphical handwriting user interface 102 according to preferred embodiment of the present invention. A lower portion of the display is the designated handwriting input area 104 with the area 105 thereabove used for displaying the recognized text that is input in area 104, as well as for other features of the various applications the device incorporates. Action icons 106, 108, 110, 112 and 114 are disposed at a right side of the handwriting user interface 102. Recognized text is displayed in the screen area 105 between a file management tool bar 116 and the handwriting input area 104. In this embodiment, a scroll bar 118 is disposed at the right side of the interface display 112. As text is entered, the entry is displayed contemporaneously as digital ink in the input area 104 as can be seen in FIG. 1A. Effectively the user is provided with the sense that the writing area is moving from right to left.

Optionally, a vertical word separator line 120 (a word demarcation for signaling the end of one word and the beginning of a next word) may be selectively displayed. Provided input continues to the left of the word separator line 120, the current word is continued. Otherwise, if input continues to the right of the word separator line 120, a word break is indicated and a new word is begun. If the word separator line 120 is not used or included, word demarcation may be done, simply, by one or more spaces or other special characters, intentionally or implicitly inserted between a current word and a next word.

As the user writes, the digital ink trails off to the left on the virtual ticker tape, as can be seen in FIG. 1B. Accordingly, when the user has finished writing the characters such as those in the illustrated word "happy," it will be shifted so that it gradually is removed from the input area 104 as by trailing off, e.g., off from the right to the left side. Also, the word separator line 120, if included and used, likewise trails off to the left edge of the input area 104 and remains there until entry resumes for the next word, "words" in this example. Otherwise, if the word separator line 120 is not used/included, the current word may still trail off with a next word begun by allowing a sufficient gap between the current word and the new entry such that the gap is recognized as a space. Alternately, a special character or a special space character may be included to signify a word break. By virtue of each word trailing off and being removed from the input area, the user is presented with substantially unlimited writing space in the normally space-constrained input area 104.

The device 100 may include a communications function and, to that end in this embodiment, an antenna 122 is shown at the top of the device 100. Individual function switches, buttons and other controls are disposed about the device, as is deemed appropriate for the particular device. The device 100 may also include an expansion port 124 or an expansion port function may be provided wirelessly through antenna 122. Preferably, the device 100 runs under a state of the art operating system for such handheld devices, e.g. Windows® CE from Microsoft Corporation, Epoc® from Symbian or the Palm OS® from Palm, Inc.

The preferred embodiment HIUI of the present invention may be employed with a handwriting recognition engine capable of recognizing handwritten text, continuously input using any combination of writing styles. The user is not restricted to cursive entry, nor is each entry delineated by a pause or by a time out between entries. Handwritten input may be provided in cursive (i.e., contiguous characters in each entry touching or connected), pure print (i.e., characters in every entry disconnected and not touching), pseudo-print (at most, pairs of characters in entries touch) or any combination thereof. Preferably, the recognition engine is the QuickPrintPro™ engine from Motorola, Inc., Lexicus Division. The recognition engine includes a main dictionary and may also include a user dictionary to which the user may add words to supplement the main dictionary.

In sentence or continuous mode, the recognition engine automatically separates or brackets each word as it is entered, using spaces, special characters or word separator line 120 to bracket individual separate words. The recognition engine takes each individual word on the fly, and compares that handwritten input word against all words contained in the main dictionary and the user dictionary. A probability score is generated by the recognition engine for each dictionary word which is indicative of the likelihood that the handwritten entry matches that particular dictionary word. Based on each word's probability score, a list of likely matches is collected. When a pen trace falls out of the visible window area, the recognizer is invoked to buffer or recognize the ink. That is, the recognizer may, or may not, return a result at that time. At the very end of writing (say after a time-out), the recognition engine is requested to process any buffered ink for which no recognition result has been returned.

Figure 2:
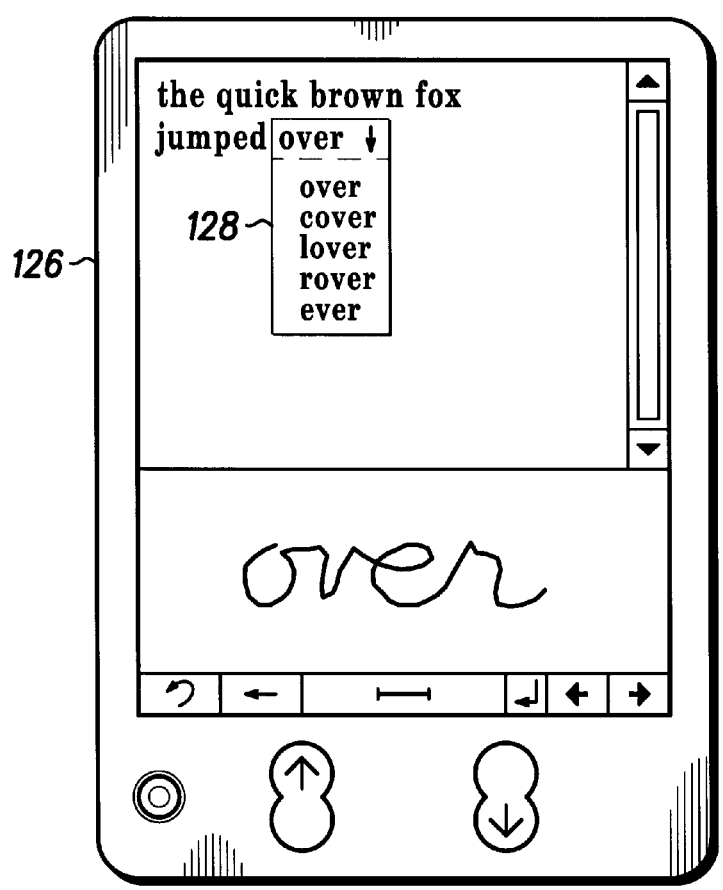
FIG. 2 is another example of a preferred embodiment handheld device including a pop-up list word recognition choices.

FIG. 2 is another example of a preferred embodiment handheld device 126 including a pop-up list 128 of recognition choices. The pop-up list 128 is available on "demand"—that is, if the user selects a word in the text buffer (such as a word corresponding to one of m previous recognition results for which a list of possible secondary results still remains). The pop-up list 128 is available only when both the application receiving the input is running in the foreground and the recognition engine is tightly coupled to it. From the list of recognition results, the handwriting recognition engine calculates a confidence level for the one word (the primary word) with the highest probability. If that confidence level exceeds a preselected or confidence threshold, it is taken as an indication that the word with the highest probability is in fact correct and the highest scoring word is displayed as the primary word choice. All other results are referred to as secondary word choices and may be included in the pop-up list 128. Every recognition result is provided with a list of a primary word, if any, and secondary word choices that are made available for the receiving application to show upon user request, e.g., by selecting a displayed recognition result. So, if the confidence level is above the preselected threshold, the HUI automatically loads a primary word choice into the device's input buffer for delivery to the active application. Otherwise, when the confidence level of the primary word choice is below the confidence threshold, an indication is provided that the recognition engine cannot find a likely candidate, e.g., by loading "???" or something similar into the device's input buffer for delivery to the active application.

Figure 3:
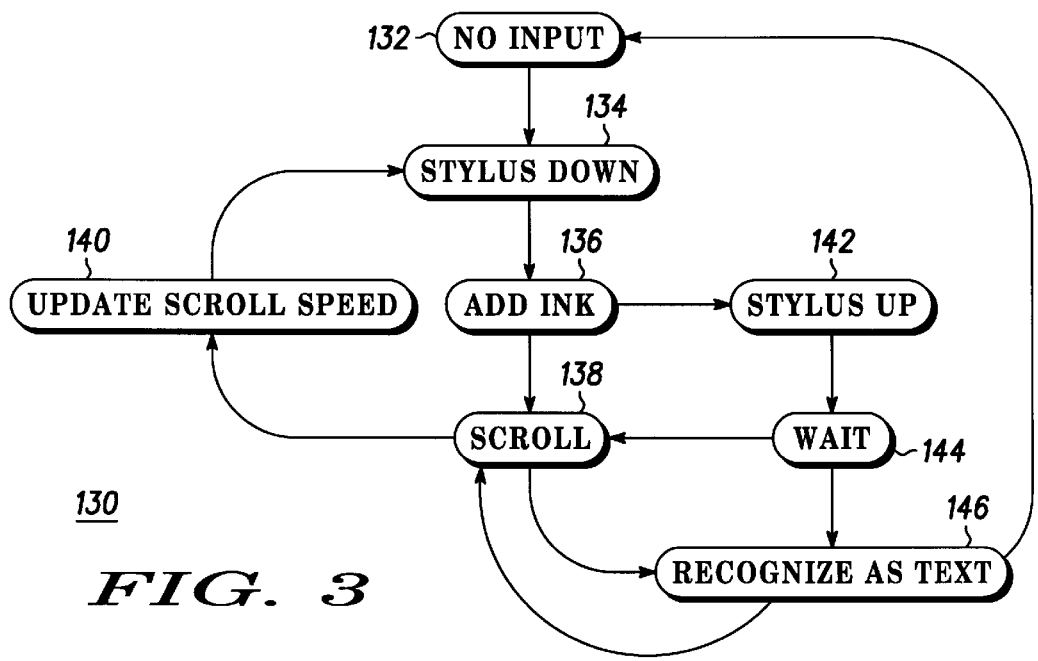
FIG. 3 shows an example of a state diagram of the preferred embodiment HIUI.

FIG. 3 is an example of a state diagram 130 of the preferred embodiment user interface which includes several individual objects or functions and may be implemented in any suitable programming language, such as tool command language (tcl) for example. A main ink area object is included, state 132, to handle ink collection and display collected results in the input window from other independent functions. When the stylus is depressed, moving to state 134, inking begins. As long as the stylus moves on the I/O screen 104 and the stylus is down, state 136, ink is added to the screen and the I/O screen 104 scrolls automatically in state 138. The scrolling speed is checked and set in state 140. If the stylus is raised, state 142, a pause is initiated at wait state 144. If a pause is long enough to indicate that an entry has been completed, then, entering text recognition state 146, the previous completed entry is recognized as text and displayed in the display area 105. In addition, whenever a pen trace falls out of the visible window area, again the recognizer is invoked. The recognizer may return a result at that time and return to state 132 to await the next entry. Otherwise, the recognizer may recognize that the current entry is incomplete and return to scroll state 138. That is, in response to a recognition call, the HUI may simply buffer the ink and wait for additional ink to arrive. If a pause during entry is short enough such that end of input is not indicated, e.g., the user is waiting for the ink to scroll off the screen to print the next letter; then, the I/O display area 104 auto scrolls in state 138 and, the scroll speed is updated, state 140.

Thus, an ink area object is included which creates a virtual canvas in the PDA screen for digital ink input, display and text recognition. The ink area object includes numerous functional objects, each providing a function for inking input/display/recognition. An initialization functional object initializes the inking area and inking area variables. A timer functional object provides a timing function for timing delays between beginning strokes and ending text entries for example. A scrolling object sets the scroll rate for the ticker tape type ink display. A vertical marking object locates a stylus marker within the inking area. Ink width can be varied with a set ink width object. A deletion object is included to provide, for example, a back space function. Ink strokes are added to the display by an add ink point object. Touching the stylus to the screen in the handwritten input area is treated analogous to pressing a mouse button and moving the mouse, dragging an object across a computer screen with the object path leaving a trail of digital ink. So, button-type control and commands are provided by button function objects such as, a button down, button up or a button motion function. In addition, a button timeout object determines if a button function response was missed or is delayed beyond a reasonable amount of time. A clear ink object and a word delete object allow a user to restart inking on an entry, for example. A recognition object may be included, as described above, to alphanumerically convert handwritten entries in the input area to text and display the text. Finally, a scrolling animation object controls auto-scrolling in inking the area, i.e., scrolling start and stop as well as initialization. Also, the scrolling animation object determines whether or not pairs of individual input entries are separated by a space.

Figure 4:
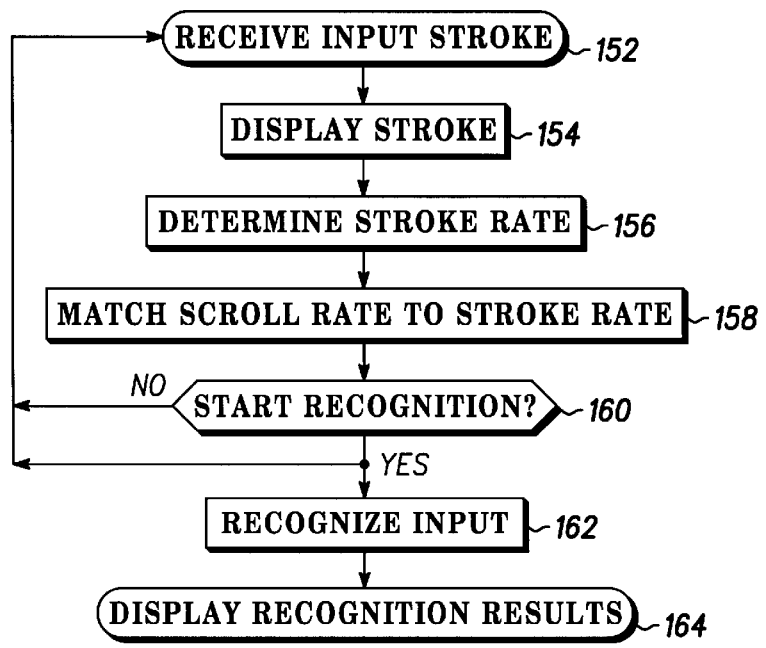
FIG. 4 is an example of a flow diagram for receiving continuous handwritten input according to the preferred embodiment of the present invention.

FIG. 4 is an example of a flow diagram 150 for receiving continuous handwritten input according to the preferred embodiment of the present invention. In step 152 the user provides handwritten input, writing in the handwritten input area and in step 154, as the user enters that handwritten input, digital ink is displayed in the handwritten input area. In step 156 the user stroke rate is determined and the step 158 the scroll rate is matched to the stroke rate. In step 160 the end of word separator, e.g., end of word separator line 120, is checked and if an end of word is found, then if word recognition is included, word recognition begins in step 162. Alternatively, an end of word may be recognized by the end of a current entry scrolling past the edge of the input field, giving the illusion of the "ink falling off of the screen" followed by sufficient passage of time, i.e., by insertion of a blank character after the word. In step 164 the recognition results from word recognition are displayed in the display area of the screen. Regardless of whether an end of word is found in step 160, handwritten input may continue in step 152.

Thus, the I/O screen of the preferred embodiment provides a handwritten input I/O screen area that behaves as a "treadmill," capable of receiving continuous handwritten input strokes and immediately displaying a duplicate of each stroke as digital ink therebeneath, automatically scrolling from right to left as the user handwrites entries on what appears to be a virtual "ticker-tape." The user is presented with illusion of endless writing space. The streaming speed of the I/O treadmill or ticker tape automatically adapts to user's writing speed in a natural way.

While the invention has been described in terms of preferred embodiments, those skilled in the art will recognize that the invention can be practiced with modification within the spirit and scope of the appended claims.

We claim:

1. An electronic device for handwritten input and contemporaneous display of said handwritten input, the device comprising:
    a housing having a touch input screen thereon for handwritten input by engagement therewith;
    a recognition engine that recognizes the handwritten input and converts the recognized input to text for display on the screen; and
    scrolling software that causes at least a portion of the screen to appear to continuously move as handwritten entries are input thereon so as to continuously present screen space on the screen to the user for input thereby maximizing character input rates.

2. The electronic device of claim 1 wherein the screen is of a predetermined size and the screen portion is smaller than the predetermined screen size so that only the screen portion appears to move during handwritten input.

3. The electronic device of claim 1 wherein the screen has an input area including the screen portion on which handwritten text is input and corresponding digital ink is displayed, and an output area separate from the input area on which recognized text is displayed.

4. The electronic device of claim 3 wherein the housing includes electronic circuitry coupled to the screen with the recognition engine operable by engagement with the screen in the input area and inoperable by engagement with the screen in the output area.

5. The electronic device of claim 3 wherein the housing includes electronic circuitry coupled to the screen, and
    an input device that when engaged with the screen input area cooperates with the circuitry to act as a digital pen for inputting text and when engaged with the screen output area cooperates with the circuitry to act as a pointer for clicking functions.

6. A handwritten input user interface (HIUI) for a portable device having a touch-enabled input screen with a predetermined area thereof, said HIUI comprising:
    a handwriting input area residing in a predetermined portion of a touch-enabled input screen, handwritten text being entered using a stylus; and
    an input/display auto scrolling window in said handwriting input area, written entries being scrolled such that the stylus entry point remains at an initial input position within said handwriting input area.

7. A HIUI as in claim 6, wherein said screen portion for the handwritten input area comprises a lower portion of said touch enabled screen.

8. A HIUI as in claim 7, wherein said handwritten input area includes a word separation line and spans said touch-enabled screen's width.

9. A HIUI as in claim 7 including a recognition engine for recognizing individual words made in a continuous handwritten stream of cursive writing in the input area.

10. A HIUI as in claim 7 including a recognition engine for recognizing individual printed words made in a continuous stream of printed text in the input area.

11. A HIUI as in claim 7 wherein said auto scrolling window has a predetermined scrolling rate based on the entry input rate.

12. A HIUI as in claim 7 further comprising:
    an output display area displaying a plurality of lines of text, recognition results being displayed in said output display area;
    a recognition engine capable of recognizing individual words entered in a continuous stream of handwritten text;
    a main dictionary, said recognition engine comparing each individual word against words in said main dictionary and providing a probability score indicative of the likelihood that each dictionary word is a correct interpretation of the individual word; and
    a user dictionary supplementing said main dictionary, words in said user dictionary being matched against each said individual word and assigned a probability score.

13. A HIUI as in claim 7 wherein stylus entries made in said handwritten input area are text entries and stylus entries made outside of said handwritten input area are pointer function entries.

14. A HIUI as in claim 7 further comprising one or more action icons on said touch-enabled screen displayed together on a side of said touch-enabled screen.

15. A HIUI as in claim 7 wherein a word separator is displayed in said handwritten input area to the right of words being entered, entries to the right of said word separator indicating start of a next word.

16. A personal digital assistant (PDA) capable of recognizing words in a continuous handwritten text stream, said PDA comprising:
    a touch-enabled input screen;
    a recognition engine capable of recognizing individual words entered in a continuous stream of handwritten text;
    a main dictionary containing a plurality of words;
    a communications port for communicating with a remotely connected computer, data being transferred between said remotely connected computer and said PDA;
    a local storage storing applications to be run on said PDA, said main dictionary and application data;
    a plurality of switches providing manual input to said PDA; and
    a handwritten input user interface (HIUI) comprising:
        a designated handwriting input area residing in a lower portion of said touch-enabled input screen, handwritten words entered using a stylus,
        an automatically scrollable output area, said handwriting input area being super-imposed on said scrollable output area, said scrollable output area displaying digital ink strokes corresponding to stylus entries made in said designated handwriting input area, said scrollable output area scrolling at a rate set by stroke rate,
        a text output area, stylus entries made in said text output area being pointer function entries, and
        one or more action icons displayed together on a side of said touch-enabled screen and providing access to editing functions for editing previously recognized displayed words.

17. A PDA as in claim 16, wherein said input area spans said touch-enabled screen's width and said automatically scrollable output area includes a word separator.

18. A PDA as in claim 17 further comprising a user dictionary stored in said storage and supplementing said main dictionary, words in said user dictionary being matched against each said handwritten input word and assigned a probability score.

19. A PDA as in claim 18 wherein said communications port is a wireless communications port, e-mail messages being communicated over said wireless communications port.

20. A method of providing handwritten input to a computer, said method comprising the steps of:
    a) receiving an entry from a designated handwritten-entry screen area;
    b) displaying a corresponding digitial ink stroke;
    c) determining ink stroke rate;
    d) shifting each displayed digital ink stroke horizontally at a rate corresponding to said ink stroke rate, whereby handwritten entries appears to be scrolling off one side of a display as on a ticker tape.

21. A method as in claim 20 further comprising:

e) passing said received entry to a handwriting recognition engine, said handwriting recognition engine converting said received entry to text; and f) displaying said text in a textual display area.

22. A method as in claim 21 wherein said handwriting recognition engine matches said entry against words in one or more dictionaries, each word in said one or more dictionaries being assigned a probability score indicative of a level of likelihood that said scored word is said entry.

23. A method as in claim 21 wherein the step (d) of shifting displayed digital ink strokes includes displaying a word separator indicating a point on the handwritten entry screen area designating demarcation between continuation of a current word and initiation of a next word.

24. A method as in claim 23, wherein said word separator scrolls with a handwritten entry when handwritten input is determined to have paused.

25. A method as in claim 23, wherein step (e) of passing said received entry is initiated when an entry is designated as initiating a next word.

26. A computer program product for inputting handwritten entries into a computer, said computer program product comprising a computer usable medium having computer readable program code thereon, said computer readable program code comprising:

computer readable program code means for continuously receiving handwritten entries;

computer readable program code means for converting said handwritten entry into digital ink;

computer readable program code means for setting a scrolling speed responsive to an entry input rate; and computer readable program code means for displaying newly entered said digital ink and removing previously displayed digital ink from a display at a rate set by said scrolling speed, displayed said digital ink appearing as if on a ticker tape.

27. A computer program product for inputting handwritten entries into a computer as in claim 26 further comprising computer readable program code means for displaying a word separator.

28. A computer program product for inputting handwritten entries into a computer as in claim 26 further comprising:

computer readable program code means for identifying individual words and calling handwriting recognition; and computer readable program code means for recognizing handwritten words and providing recognized said words to a display.

29. A computer program product for inputting handwritten entries into a computer as in clam 28 wherein the computer readable program code means for receiving handwritten entries further comprises:

computer readable program code means for determining whether said handwritten entries are being made in an input area of a touch sensitive screen or in an other area of said touch sensitive screen than said input area; and computer readable program code means for providing commands responsive to entries in said other area, entries in said input area being received as handwritten entries.

* * * * *